US 7,660,891 B2

(12) United States Patent
    Black

(10) Patent No.: US 7,660,891 B2
(45) Date of Patent: Feb. 9, 2010

(54) NODE DISCOVERY INVOLVING STEALTH NODE ENUMERATORS

(75) Inventor: Richard John Black, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 470 days.

(21) Appl. No.: 11/302,651

(22) Filed: Dec. 14, 2005

(65) Prior Publication Data

US 2006/0168180 A1    Jul. 27, 2006

Related U.S. Application Data

(63) Continuation-in-part of application No. 10/955,938, filed on Sep. 30, 2004.

(51) Int. Cl.
    *G06F 15/173* (2006.01)
(52) U.S. Cl. .................... 709/224; 370/248; 370/390
(58) Field of Classification Search ............ 709/224
    See application file for complete search history.

(56) References Cited

U.S. PATENT DOCUMENTS

| 6,233,611 | B1 | 5/2001 | Ludtke et al. |
| 6,246,409 | B1 | 6/2001 | Veghte et al. |
| 7,319,671 | B1* | 1/2008 | Mohan ....................... 370/248 |
| 2005/0125529 | A1 | 6/2005 | Brockway |
| 2005/0157720 | A1* | 7/2005 | Chandhok et al. ........... 370/390 |
| 2006/0124720 | A1* | 6/2006 | Burbridge et al. ........... 235/375 |

OTHER PUBLICATIONS

International Search Report dated Apr. 27, 2007 for Application No. PCT/US2006/046472, 10 pages.

* cited by examiner

*Primary Examiner*—Vivek Srivastava
*Assistant Examiner*—Vivek Krishnan

(57) ABSTRACT

A network node discovery method allows multiple enumerators to concurrently accept and interpret the same enumeration responses from responder nodes on a network. In this manner, the responder nodes do not have to issue individual responses for each enumerator. Each responder maintains a discovery state and one or more per-enumerator session states to manage when the responder should transmit enumeration responses. The enumeration, therefore, proceeds at a target network load, irrespective of the number of enumerators present, and completes in a short time by making efficient use of the network capacity available. Furthermore, an enumerator can determine that it need only wait for responses solicited by other enumerators, rather than requesting them, thereby reducing network traffic in the presence of many concurrently enumerating nodes.

18 Claims, 11 Drawing Sheets

NODE DISCOVERY INVOLVING STEALTH NODE ENUMERATORS

CROSS-REFERENCE TO RELATED APPLICATIONS

This application is a continuation-in-part application of U.S. patent application Ser. No. 10/955,938, entitled "Network Node Enumeration" and filed on Sep. 30, 2004, specifically incorporated herein by reference for all that it discloses and teaches.

This application is also related to U.S. patent application Ser. No. 11/302,726 entitled "Node Discovery Involving Multiple Node Enumerators", and U.S. patent application Ser. No. 11/302,681, entitled "Network-specific Estimation in Network Node Discovery", both filed concurrently herewith, which are specifically incorporated herein by reference for all that they disclose and teach.

BACKGROUND

A local area network (LAN) is a computer network covering a small local area, like a home, office, or small group of buildings, such as a business or college campus. Modem LANs are most likely based on switched Ethernet or Wi-Fi technology running at from 10 to 1000 Mb/s (megabits per second), although other technologies may also be employed. Typical characteristics of LANs, in contrast to wide area networks (WANs), may include: (a) much higher data rates, (b) smaller geographic range; and (c) a lack of leased telecommunication lines.

Network node discovery can be used in a computer network, such as a LAN, to identify other devices or nodes within the network. Typically, a specific node (referred to as an "enumerator") requests responses from other nodes (referred to as "responders") in the network. In the manner, the enumerator can develop a list of the other active nodes within the network. Network node discovery results can be used, for example, to identify entry of devices into the network, to detect the removal of devices from the network, to optimize routing and load balancing, etc.

Furthermore, a network with multiple enumerators presents additional challenges to network node enumeration as compared to a single enumerator network. However, existing network node discovery implementations can be slow and are generally not robust or easily scalable, particularly in the presence of multiple enumerators. Such implementations tend to rapidly increase the load on the network as the number of enumerators increases, risking network overload.

SUMMARY

Implementations described and claimed herein address some of the foregoing problems by allowing multiple enumerators to concurrently accept and interpret the same enumeration responses from responder nodes on the network. In this manner, the responder nodes do not have to issue individual responses for each enumerator. Each responder maintains a discovery state and one or more per-enumerator session states to manage when the responder should transmit enumeration responses. The enumeration, therefore, proceeds at a target network load, irrespective of the number of enumerators present, and completes in a short time by making efficient use of the network capacity available. Furthermore, an enumerator can determine that it need only wait for responses solicited by other enumerators, rather than requesting them, thereby reducing network traffic in the presence of many concurrently enumerating nodes.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Described herein are various implementations of systems and methods for network node enumeration. In accordance with some of the systems and methods described herein, one or more enumerating nodes (i.e., "enumerators") send an enumeration request to other nodes in the network. In response to receiving an enumeration request, nodes (i.e., "responders") that are accessible (i.e., "on-line") send an enumeration response that can be received by the enumerators, thereby identifying themselves as accessible to the enumerators. The enumerating nodes then send acknowledgements of the received enumeration responses. In one implementation, the enumerating nodes send such acknowledgements in one or more future enumeration requests.

To reduce excessive network congestion that may arise from a large number of responders sending enumeration responses simultaneously in reply to an enumeration request, enumeration responses are sent from responders at varying times. To lessen the likelihood that a malicious node may instigate the simultaneous sending of enumeration responses from a large number of accessible nodes, each responder independently determines the time at which it sends its enumeration response.

In some implementations, each responder independently schedules the time or times at which an enumeration response is sent based on observations of network activity and/or predictions of future network activity made at the node. Additionally, in some implementations, each accessible node employs a "round based" scheduling method, where each enumeration response is scheduled to be sent in one of a number of timing rounds.

Figure 1:
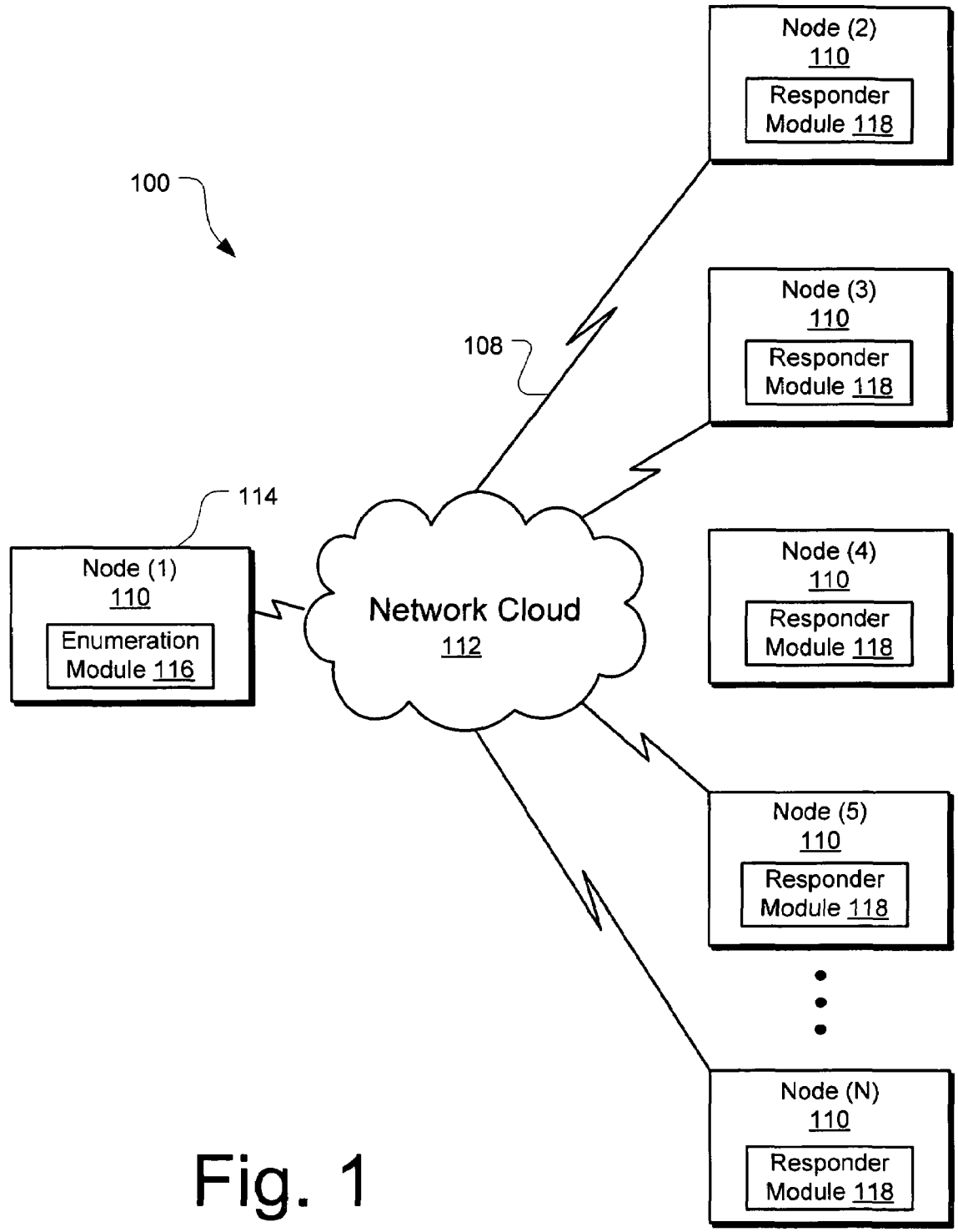
FIG. 1 is a generalized representation of computer network in which network node enumeration in accordance with the systems and methods described herein may be implemented.

Turning now to FIG. 1, shown therein is a generalized representation of computer network 100. The network 100 illustrates one possible environment in which network node enumeration may take place. The computer network 100 includes some number of nodes 110 interconnected through a network cloud 112. The variable N is used to represent an individual node's estimate of the number of accessible nodes on the network. Different nodes can have different estimates of this number, but the individual estimates are usually similar in value. In FIG. 1, an arbitrary estimate N is used.

The network cloud 112 indicates generally that data (e.g., enumeration requests and enumeration responses) may take various routes through various network paths, devices, and/or transmission mediums (e.g., wired or wireless) as the data travels between nodes 110. A jagged line between a node 110 and the network cloud 112, such as line 108, indicates that a node 110 is accessible (i.e., "on-line") in the network 100. For example, each of nodes (1), (2), (3), (5), and (N) is shown as being accessible in the network 100, while node (4) is shown as being inaccessible ("off-line") in the network 100.

As used herein, the term "node" refers to any computer system, device, or process that is uniquely addressable, or otherwise uniquely identifiable, in a network (e.g., network 100) and that is operable to communicate with other nodes in the network. For example, and without limitation, a node may be a personal computer, a server computer, a hand-held or laptop device, a tablet device, a multiprocessor system, a microprocessor-based system, a set top box, a consumer electronic device, a network PC, a minicomputer, a mainframe computer, a distributed computing environment that includes any of the above systems or devices, or the like. An example of a network node 110, in the form of a computer system 600, is set forth below with respect to FIG. 6.

In cases where a node comprises a computer system or device of some form, the node typically includes a processor and one or more forms of computer-readable media, and one or more communications connections, which allow the node to operatively connect to the network 100. As used herein, computer-readable media may be any media that can store or embody information that is encoded in a form that can be accessed and understood by a computer. Typical forms of computer-readable media include, without limitation, both volatile and nonvolatile memory, and data storage devices including removable and/or non-removable media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

As shown, node (1) 114 includes an enumeration module 116, while nodes (2)-(N) each include a possible responder module 118. Generally, the enumeration module 116 provides node (1) 114 with various functionality to perform network node enumeration. For example, the enumeration module 116 may provide node (1) 114 with the functionality to construct enumeration requests, schedule the sending of enumeration requests, send enumeration requests, send enumeration response acknowledgments, process information contained in received enumeration responses, determine the number of accessible nodes in the network, and/or identity of accessible nodes in the network. Generally, each responder module 118 provides the node 110 in which it is included or associated with the capability to process received enumeration requests, to determine, based on some criteria and/or logic, a time at which to send an enumeration response. It should also be understood that an individual node may include both enumeration and responder modules. As used herein, the term "sending" refers generally to transmitting information, such as enumeration requests and enumeration responses, over the network 100 (e.g., broadcasting, multicasting, unicasting, etc.).

It should be understood that the functionality that is described herein with respect to a particular module might be carried out by the module itself, by the module in cooperation with the node in which the module is included or associated, or by a number of sub-modules. For example, in some implementations, the operations performed by a module are implemented as computer-executable instructions that are embodied in one or more computer-readable media. In these implementations, the operations of the module may be executed by a processor or processors in the node in which the module is included or associated. In other implementations, the operations of a module may be implemented as hardware, firmware, or some combination of hardware, firmware, and software, either as a part of, or in some other way associated with, the node in which the module is included or associated. Furthermore, the functionality that is described herein with respect to a particular module might be carried out by, or distributed across, a number of nodes.

Turning now more particularly to some specific functionality of the enumerator module 116, in one implementation, the enumeration module 116 sends a number of temporally spaced enumeration requests to responder modules 118 in the network 100. The spacing between the sent enumeration requests may be periodic or non-periodic. For example, in one implementation, enumeration requests are sent in evenly spaced time intervals, referred to herein as "request intervals." In another implementation, enumeration requests are sent out at various randomly selected times. In yet other implementations, enumeration requests are sent at times determined by the enumeration module 116 based on some other schedule, logic, and/or determinations made by the enumeration module 116.

In one implementation, enumeration requests include, among other things, information identifying (acknowledging) nodes 110 that have previously sent enumeration responses that were received by the enumeration module 116. In one implementation, each enumeration request includes information identifying nodes 110 that have sent enumeration responses received by the enumeration module in a given time frame (e.g., an enumeration session). For example, in one implementation, each enumeration request can include information (e.g., acknowledgements) identifying nodes 110 that have sent enumeration responses since the last enumeration request was sent by the enumeration module. In one implementation, enumeration requests may identify nodes 110 that have previously been acknowledged. In another implementation, the number of times a given node is acknowledged in an enumeration request may be limited or capped.

When the enumeration module 116 receives an enumeration response, information contained in the response may be stored for processing or later retrieval. For example, the enumeration module 116 may create and/or maintain one or more data structures in which the identities (e.g., network addresses) of each node that sent an enumeration response are stored. In one implementation, the enumeration module 116 maintains one data structure including the addresses of all nodes that have sent enumeration responses since the last enumeration request was sent and another data structure including the addresses of all nodes that have sent enumeration responses throughout the enumeration session. In this implementation, the data structure including the addresses of all nodes that have sent enumeration responses since the last enumeration request may then be used to construct the next enumeration request, while the data structure that including the addresses of all nodes that have sent enumeration responses throughout the enumeration session may be used for final network node enumeration. In other implementations, the enumeration module 116 compiles and/or stores various other data that are used in the enumeration session.

In some implementations, the enumeration module 116 sends enumeration requests, and receives and processes enumeration responses until a predetermined condition (e.g., a timing condition, etc.) has been met. For example, and without limitation, in one implementation, the enumeration module 116 continues to send enumeration requests until a given time period has elapsed since the last enumeration response was received by the enumeration module 116. In another implementation, the enumeration module 116 continues to send enumeration requests until the number of responses per a given time period is below some minimum value. In yet another implementation, the enumeration module 116 sends enumeration requests until the number of responses received per a given time period is below some minimum value, and then continues to send enumeration requests for an additional predetermined time period.

In one implementation, the information received from the nodes during the enumeration session is analyzed and/or compiled to produce various enumeration data. For example, the number and/or identities of all the nodes that sent enumeration responses during the enumeration session, in addition to other information, may then be determined.

Figure 2:
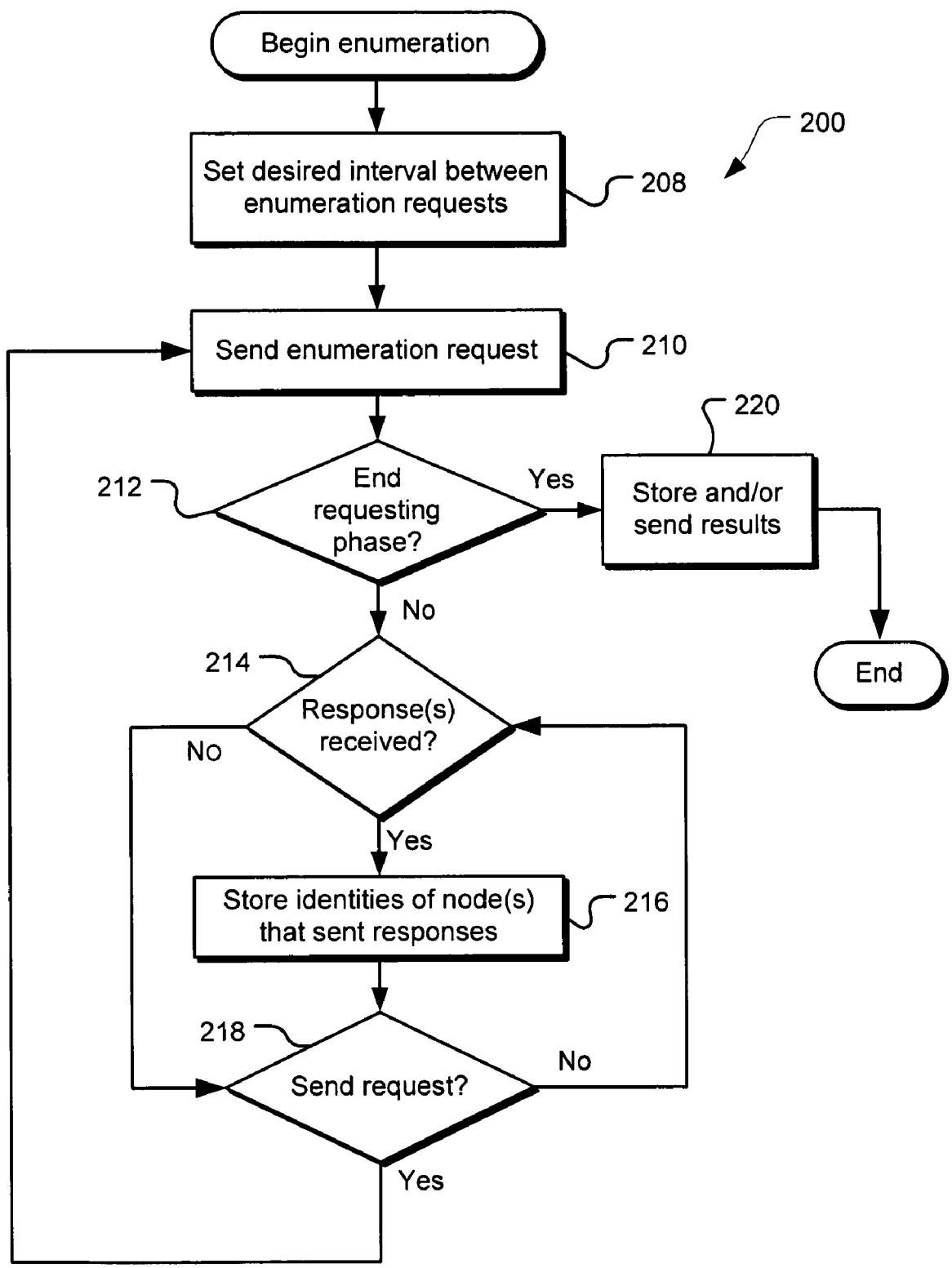
FIG. 2 illustrates an operational flow including various operations that may be performed in an enumeration session performed by an enumerator in a network, such as the network of FIG. 1.

FIG. 2 illustrates an operational flow 200 including various operations that may be performed in an enumeration session performed by an enumerator in a network. The following description of FIG. 2 is made with reference to the network 100 of FIG. 1. In particular, the description of FIG. 2 is made with reference to the enumeration module 116 and network 100 of FIG. 1. However, it should be understood that the operational flow described with respect to FIG. 2 is not intended to be limited to being performed by the enumeration module 116, or in network 100. Additionally, it should be understood that while the operational flow 200 indicates a particular order of operation execution, in other implementations the operations may be ordered differently.

The operational flow 200 illustrates, among other things, a requesting phase. The requesting phase is that portion of the enumeration session where enumeration responses are being sent to nodes in the network. The requesting phase is shown in operational flow 200 as an operational loop including operations 210-218.

As shown, at operation 208 a desired interval between enumeration requests is set. In the implementation shown in FIG. 2, operation 208 occurs once during the operational flow 200, preceding the requesting phase. In an alternative implementation, operation 208 may also occur during the requesting phase. This provides the flexibility to change the desired interval between enumeration requests during the requesting phase based on operational or network conditions or operator preference.

Next, at operation 210 an enumeration request is sent by the enumeration module 116 to nodes 110 in the network 100. The enumeration request sent in operation 210 may include, among other things, information identifying nodes 110 that have previously sent enumeration responses that were received by the enumeration module 116. That is, the enumeration request sent in operation 210 may include an acknowledgement of nodes 110 that have previously sent enumeration responses that were received by the enumeration module 116.

In one implementation, the enumeration request sent in operation 210 includes information identifying or acknowledging only those nodes 110 that have sent an enumeration response that was received by the enumeration module 116 since the last enumeration request was sent by the enumeration module 116. In other implementations, the enumeration response sent in operation 210 includes information identifying all or some of the nodes 110 that have sent an enumeration response that were received by the enumeration module 116 during the present enumeration session.

Next, it is determined at operation 212 whether the enumeration module 116 should end the requesting phase of the enumeration session. That is, a determination is made as to whether the operational loop formed by operations 210-218 should be exited. The determination made at operation 212 may be based on various factors. In some implementations, the determination made at operation 212 is made based on some criterion or criteria that indicate or suggest that all nodes that were likely to respond during the enumeration session have already responded. For example, in one implementation if a predetermined time has passed since the last enumeration response was received by the enumeration module 116, the determination is made at operation 212 to end the requesting phase of the enumeration session. In other implementations, other criteria may be used in determining whether the enumeration module 116 ends the requesting phase of the enumeration session. It should be appreciated that operation 212 may occur at points in the operational loop formed by operations 210-218 other than after operation 210.

If it is determined at operation 212 that the enumeration module 116 should end the requesting phase, the operational flow 200 continues to operation 220, described below. However, if it is not determined at operation 212 that the enumeration module 116 should end the requesting phase, the operational flow proceeds to operation 214, where a determination is made whether any enumeration responses have been received since the last enumeration request was sent by the enumeration module 116.

If it is determined at operation 214 that no enumeration responses have been received since the last enumeration request was sent by the enumeration module 116, the operational flow 200 continues to operation 218, described below. If, however, it is determined at operation 214 that one or more enumeration responses have been received since the last enumeration request was sent by the enumeration module 116, the identities of the nodes that sent the responses are stored, and the operational flow 200 continues to operation 218.

At operation 218, it is determined whether an enumeration request is to be sent. This determination may be made in various ways. For example, in one implementation, the determination is made based on whether a time period equal to the desired interval between enumeration requests, set at operation 208, has elapsed since the last enumeration request was sent by the enumeration module 116. If it is determined at operation 218 that an enumeration request is to be sent, the operational flow 200 returns to operation 210. If it is determined at operation 218 that an enumeration request is not to be sent, the operational flow returns to operation 214. It should be appreciated that operation 218 may occur at points in the requesting phase other than after operation 214.

Returning to operation 212, as noted above, if it is determined therein that the enumeration module 116 should end the requesting phase, the operational flow 200 continues to operation 220. At operation 220, data gathered during the enumeration session is compiled and sent and/or stored, and the operational flow 200 ends. Some examples of the type of data that may be compiled at operation 220 include a count and/or identification of all nodes that responded to enumeration requests sent by the enumeration module 116 within a given time period.

In some implementations, operation 220 is not located in the operational flow 200 following operation 212. That is, in some implementations, operation 220 is not carried out following a determination that the enumeration module 116 should end the requesting phase of the enumeration session. Rather, in some implementations, the task of compiling and sending data may occur at one or more points during the requesting phase, or continuously throughout the requesting phase.

Each responder module 118 monitors the network for the sending of enumeration request from the enumeration module 116. In various implementations described herein, upon detecting an enumeration request, each responder module 118 executes a response scheduling method. Generally, response scheduling methods determine if a responder module 118 will respond to an enumeration request by sending an enumeration response. If it is determined that the responder module will respond to the enumeration request, the scheduling method determines the time at which the responder module 118 will send the enumeration response.

There are a number of different types of response scheduling methods that may be employed by the responder modules 118. For example, and without limitation, FIGS. 3, 4, and 5 each illustrate a response scheduling method that may be employed by the responder modules 118. In some implementations, each responder module in the network 100 uses the same or a substantially similar response scheduling method during a given enumeration session. In other implementations, different scheduling methods may be used by various responder modules 118 in the network 100.

Figure 3:
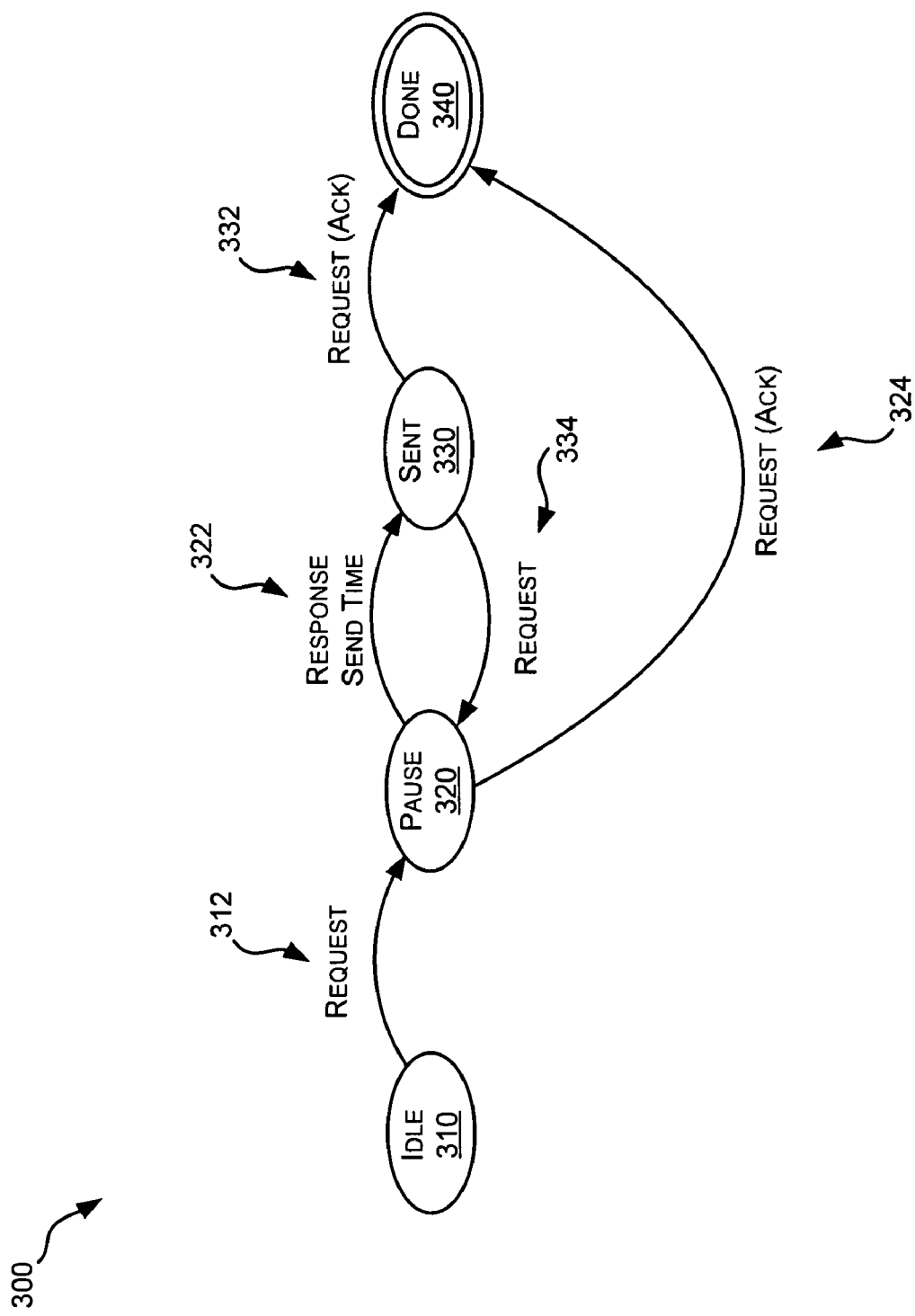
FIG. 3 is a simplified state transition diagram illustrating example states through which a responder module may transition during network enumeration.
Figure 4:
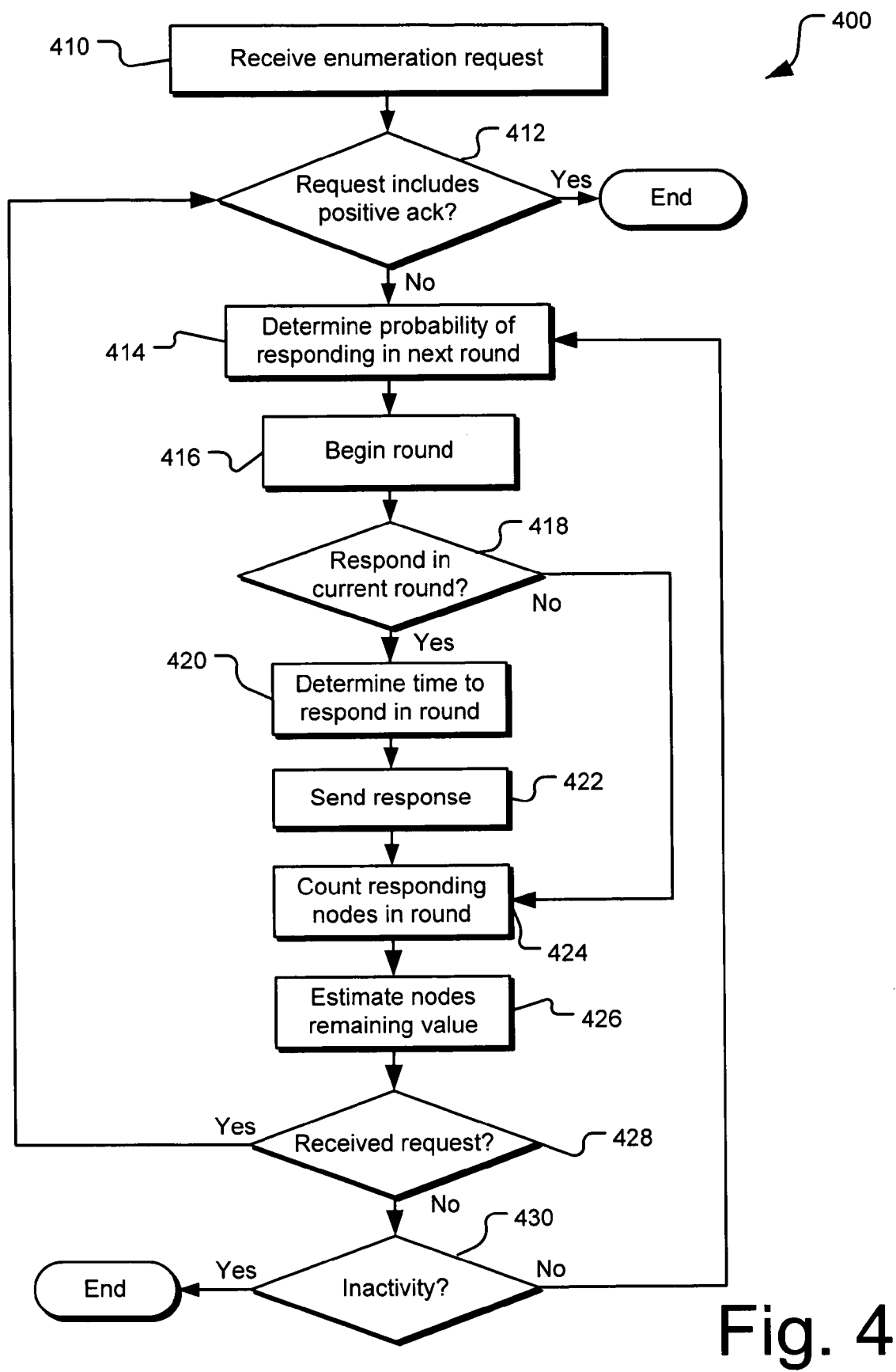
FIG. 4 illustrates an operational flow for a fixed round length scheduling method in a responder module in a network, such as the network of FIG. 1.
Figure 5:
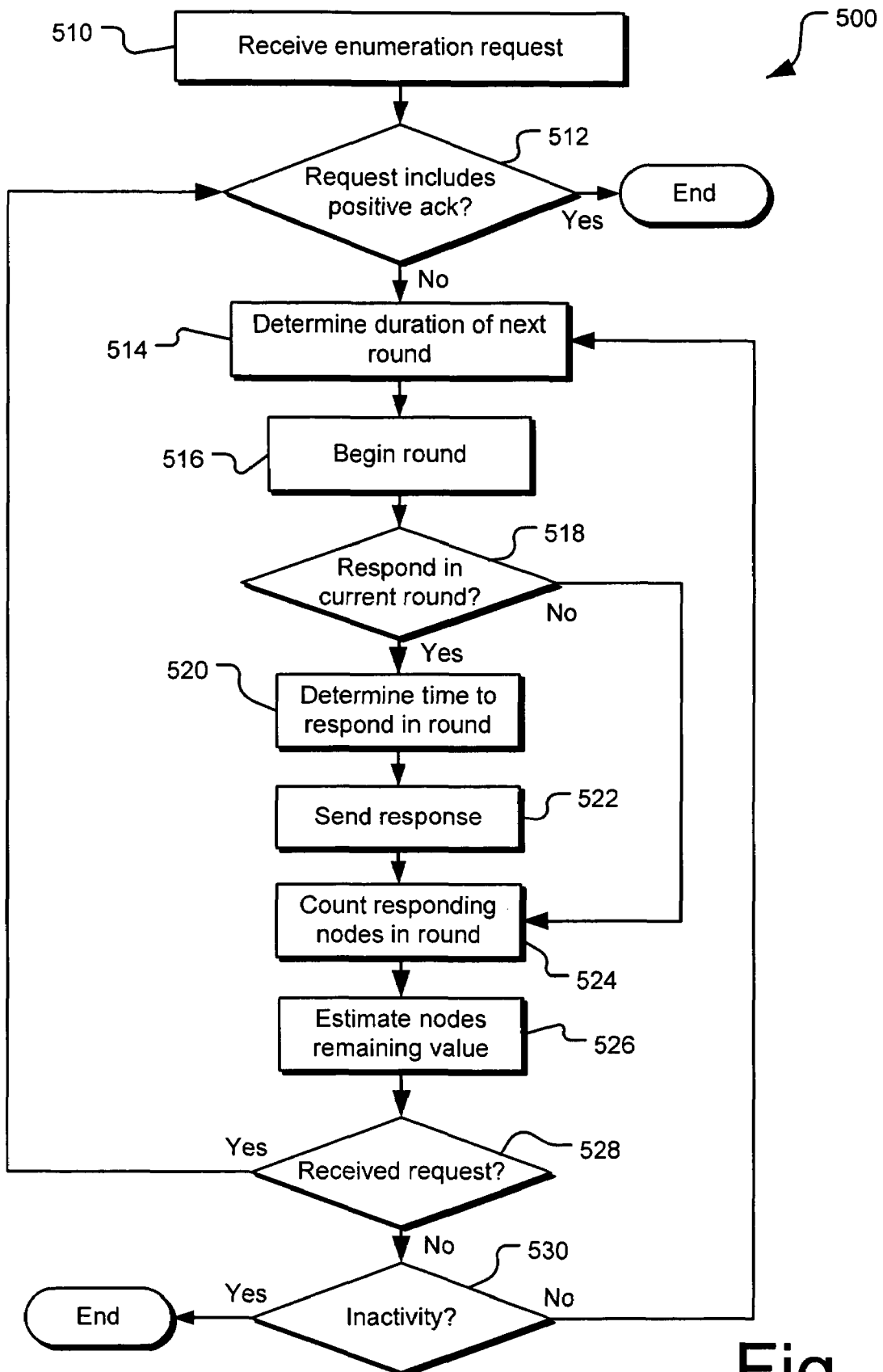
FIG. 5 illustrates an operational flow for a variable round length scheduling method in a responder module in a network, such as the network of FIG. 1.

The following descriptions of FIGS. 3, 4, and 5 are made with reference to the network 100 of FIG. 1. In particular, the descriptions of FIGS. 3, 4, and 5 are made with reference to the responder modules 118 and the enumerator module 116 of the network 100. However, it should be understood that the scheduling methods described in FIGS. 3, 4, and 5 are not intended to be limited to being performed by the responder modules 118, the enumeration module 116, or in network 100. Additionally, it should be understood that while the scheduling methods shown in FIGS. 3, 4, and 5 each indicate a particular order of operations and/or states, in other implementations the operations and/or states might be ordered differently, various shown operations and/or states may not be carried out or included, and/or other operations and/or states may be included.

Turning first to FIG. 3, shown therein is a simplified state transition diagram illustrating example states through which the responder module 118 may transition during network enumeration. As shown, the responder module 118 is initially in an idle state 310. Upon receipt of an enumeration request 312, the responder module 118 sets a response timer, determines an enumeration response send time, and transitions from the idle state 310 to a pause state 320. The enumeration response send time specifies a time, with reference to the timer, at which the responder module is to send an enumeration response to the enumerator module 116.

The responder module 118 may determine the enumeration response send time in various ways. In some implementations, the responder module 118 determines the enumeration response send time based on observations made by the responder module 118 of enumeration responses sent from other responder modules. More particularly, in these implementations, the responder modules uses these observations to set an enumeration send time using a timing method that, assuming other nodes in the network are using a similar timing method, would tend to produce a desired distribution of sent enumeration responses across the network. It should be understood that while the timing method may use the assumption that other nodes in the network are using a similar timing method, this assumption may be incorrect.

In one such implementation, the observations made by the responder module 118 relate to an average enumeration response density across the network caused by the sending of enumeration responses by other responder modules. In another such implementation, the observations made by the responder module 118 relate to a network load in terms of an amount of data sent per a given time period (e.g., bits per second) across the network due to the sending of enumeration responses by other responder modules. More particular examples of how send times may be computed are described below with respect to FIGS. 4 and 5.

Once in the pause state 320, the responder module 118 waits for either the timer to reach the response send time 322 or the receipt of an enumeration request 324 including an acknowledgment that the enumeration module 116 has received an enumeration response from the responder module 118 (a positive acknowledgement). In the case where the timer reaches the response send time 322, the responder module sends an enumeration response, either at the response send time or at another time, and transitions to a sent state 330. In the case where the responder module receives a positive acknowledgement 324, the responder module 118 transitions to a done state 340.

Once in the sent state 330, the responder module 118 waits for the receipt of an enumeration request 332 or 334. If the enumeration request does not include a positive acknowledgement 334, the responder module 118 sets a response timer, determines an enumeration response send time, and transitions from the sent state 330 to the pause state 320, as described previously. If the enumeration request includes a positive acknowledgement 332, the responder module 118 transitions from the sent state 330 to the done state 340.

In some implementations, the responder modules 118 employ "round based" scheduling methods. Round based scheduling methods schedule the sending of an enumeration response during one of a number of sequential timing rounds, which may be generally synchronized between the various responder modules in the network. In round based scheduling, the timing of the rounds is computed separately by each responder module 118. However, a general synchronization may occur between the timing rounds in the various responder modules 118 due to the common scheduling methods used in the responder modules 118, and the roughly simultaneous start time for the scheduling methods, which are triggered by an enumeration request.

Round based scheduling may be classified as either fixed round length scheduling or variable round length scheduling, although other types of scheduling may be employed. In fixed round length scheduling, the duration of each timing round in a given sequence of timing rounds is approximately the same. In contrast, in variable round length scheduling, the duration of each timing round in a given sequence of timing rounds may vary.

In both fixed round length scheduling and variable round length scheduling, an attempt is made to evenly distribute the sending of enumeration responses from all accessible responder modules at some desired minimum average time between enumeration responses. To accomplish this, both fixed and variable round length scheduling methods calculate a nodes remaining value ($N_r$) and a minimum interval value (I). The nodes remaining value ($N_r$) is an integer which specifies an estimate of the number of nodes that have not yet received a positive acknowledgement from the enumeration module 116. The minimum interval value (I) specifies a desired minimum average time between enumeration responses across the network, from responder modules in all accessible nodes, during the enumeration session.

In fixed round length scheduling, the values of $N_r$ and I are used to determine whether an enumeration response is sent in a given round. In variable round length scheduling, the values of $N_r$ and I are used to determine the length of the rounds.

The manner in which the nodes remaining value ($N_r$) is determined is dependant on the type of round based scheduling used. Some examples of ways in which the nodes remaining value ($N_r$) may be determined are described below with respect to FIGS. 4 and 5. The value of I may be selected empirically, or calculated based on various parameters, such as maximum network size, network transmission speeds, etc. In some implementations, I is specified in milliseconds (ms). In other implementations, I is expressed in other units of time. Once obtained, the value of I may be stored in, or otherwise made accessible to, all of the responder modules 118 in the network.

FIGS. 4 and 5 each illustrate an operational flow for one possible implementation of a scheduling method. The following discussion with respect to FIGS. 4 and 5 are made with respect to a single responder module 118 in response to a single enumeration request. It should be understood that the operation flows shown in FIGS. 4 and 5 may take place in the responder module 118 each time enumeration requests are received by the responder modules 118. Furthermore, it should be understood that the same or similar operational flows as those shown in FIGS. 4 and 5 would typically take place in each accessible responder module 118 in the network 100 during an enumeration session.

FIG. 4 illustrates one possible operational flow 400 for a fixed round length scheduling method in a responder module 118. In some implementations, the scheduling method illustrated by operation flow 400 is performed by the responder module 118 each time an enumeration request is received by the responder module. In other implementations, the scheduling method illustrated by operation flow 400 is performed by the responder module 118 only at specified times. That is, in some implementations, the scheduling method illustrated by operation flow 400 is "turned on" or "turned off" based on various operational conditions or user needs.

In some implementations, at some time prior to performance of the operational flow 400 in the responder module, a timing round duration value ($t_d$) is determined that specifies the duration of the timing rounds used in the fixed round length scheduling method. The value of $t_d$ may be selected empirically, or calculated based on various parameters, such as maximum network size, network transmission speeds, etc. In some implementations, $t_d$ is an integer value that indicates the duration of the timing rounds in milliseconds (ms). In other implementations, $t_d$ is expressed in other units of time. Once obtained, the value of $t_d$ is stored in, or otherwise made accessible to, all of the responder modules 118 in the network.

In many implementations, the value $t_d$ is determined before the start of the enumeration session. In most implementations, the value $t_d$ remains constant throughout the scheduling method. In some implementations, the value $t_d$ has a first value for the first timing round in the scheduling method and is adjusted to a second value for the remaining timing rounds in the scheduling method, based on such factors as the observed process load.

At operation 410, an enumeration request is received by the responder module 118. The receiving of the enumeration request begins, or "triggers," the scheduling method in the responder module 118. At operation 412, a determination is made whether the received enumeration request includes an indication that an enumeration response has already been received by the enumeration module 116 from the responder module 118 (a "positive acknowledgement"). For example, the responder module may have sent an enumeration response in a reply to an enumeration request sent at an earlier time in the enumeration session.

If it is determined at operation 412 that the received enumeration request includes a positive acknowledgement, the operational flow 400 ends. If, however, it is determined at operation 412 that the received enumeration request does not include a positive acknowledgement, a determination is made at operation 414 of a probability value (φ) that specifies the probability that an enumeration response will be sent in the next timing round in a sequence of timing rounds occurring during the operational flow 400.

The probability value (φ) may be selected or determined in various ways. For example, in one implementation the value φ is determined based on an estimate of the number of responder modules that have yet to send an enumeration response to the enumeration module 116. In one implementation, φ is determined according to the following:

$$\phi = \frac{t_d}{N_r \times I} \quad \text{Equation (1)}$$

The first time operation 414 is performed, the value of $N_r$ is initially set to a maximum node value ($N_{max}$), which represents an estimate of the maximum number of accessible nodes in the network 100. Each successive time in the operational flow that operation 414 is performed, $N_r$ is then determined based on observed responses sent from other responder modules, as described in detail below.

Next, a timing round operation 416 begins a timing round of duration $t_d$. Substantially simultaneously with the start of the timing round, it is determined at operation 418 if an enumeration response is to be sent by the responder module 118 during the timing round. This determination is made with a probability φ, as determined in operation 414. That is, some mechanism or algorithm is used to select whether an enumeration response will be sent during the present round with a probability $\phi$.

If it is determined at operation 418 that an enumeration response is not to be sent during the current timing round, the operational flow 400 proceeds to operation 424, described below. However, if it is determined at operation 418 that an enumeration response is to be sent during the current timing round, the precise time during the round at which the enumeration response is to be sent is then made at operation 420. In one implementation, the time during the round at which the enumeration response is to be sent is selected randomly over the duration of the round. In other implementations, the time during the round at which the enumeration response is to be sent may be selected in other ways. Following operation 420, an enumeration response is sent at operation 422 at the time determined during operation 420.

Following operation 422, a count (r) is made at operation 424 of all nodes that sent an enumeration response during the current timing round. In one implementation, the count (r) is made by the responder module by monitoring the network and counting the number of enumeration responses that are sent in the network during the current timing round. It should be appreciated that while operation 424 is shown as occurring following operation 422, in operation, the count of enumeration responses sent in the network during the current timing round would typically occur throughout all or most of the timing round.

Next, the operational flow 400 proceeds to operation 426 where the nodes remaining value ($N_r$) is estimated. In general, $N_r$ is estimated based on observed responses sent from other responder modules. For example, in one implementation the nodes remaining value ($N_r$) is calculated according to the following:

$$N_r = \frac{N_{previous} \times r \times I}{t_d} - r \qquad \text{Equation (2)}$$

The first time in the operational flow 400 that operation 426 is performed, the value of $N_{previous}$ is the same as $N_{max}$. Each subsequent time that operation 426 is performed in the operational flow 400, the value of $N_{previous}$ will be the value of $N_r$ calculated the last time in the flow 400 that operation 426 was performed.

In some implementations, the calculated value of $N_r$ may have an upper bound ($N_{UB}$) and/or lower bound $N_{LB}$. The values of $N_{UB}$ and $N_{LB}$ may be selected in various ways. For example, and without limitation, these values may be predetermined fixed values, they may be calculated during the operational flow 400, they may be based on various observed node or network behavior, and/or they may be percentages of previous or current calculated values of $N_r$.

Additionally, in some implementations, rather than using the value ($t_d$) at operation 426 in estimating or calculating $N_r$, the actual duration of the timing rounds is measured ($t_{actual}$), and the measured value $t_{actual}$ is then used in estimating or calculating $N_r$. For example, the value $t_{actual}$ would be used instead of the value $t_d$ in Equation (2) shown above.

Next, a determination is made at operation 428 whether an enumeration request has been received during the current timing round. If it is determined that a request has been received during the current timing round, the operational flow returns to operation 412, described above. If it is determined that a request has not been received during the current timing round, the operational flow proceeds to operation 430, where a determination is made whether an inactivity condition has been met.

The inactivity condition may be selected and/or determined in a number of ways. For example, in one implementation, the inactivity condition is met if a given time has passed since the receipt of an enumeration request. If it is determined at operation 430 the inactivity condition has been met, the operational flow ends. However, if it is determined at operation 430 that determination the inactivity condition has not been met, the operational flow returns to operation 414, as previously described.

As described, the operational flow 400 will end when either an enumeration response including a positive acknowledgement is received (operation 412) or if an inactivity condition has been met (operation 430). In addition, in some implementations, at any point in the operational flow where an enumeration request is received, a determination is made whether the request includes a positive acknowledgment. If it is determined that the received request does not include a positive acknowledgment, the operational flow continues. For example, if a request is received following operation 416, but before operation 418, which does not include a positive acknowledgement, the operational flow would continue to operation 418. If it is determined that the received request does include a positive acknowledgment, the operational flow ends.

In one implementation, a count is kept by the responder module of the total number (TR) of observed enumeration responses sent from other responder modules during since the beginning of the operational loop 400. In accordance with this implementation, each time an enumeration request is received by the responder module, the value ($TR_{mb}$) of TR at the time the request was received is stored. That is, a value $TR_{mb}$ is stored for each request received. At the end of a given round i, the most current value of $TR_{mb}$ is compared with the value $TR_{mb}$ at the end of the previous timing round. If the most current value of $TR_{mb}$ is greater than the value $TR_{mb}$ at the end of the previous timing round, the difference ($TR_{diff}$) between the most current value of $TR_{mb}$ and the value $TR_{mb}$ at the end of the previous timing round is added to the value $N_r$ determined at operation 426 of the operational flow 400, as expressed in the following:

$$N_r = \frac{N_{previous} \times r \times I}{t_d} - r + TR_{diff} \qquad \text{Equation (3)}$$

FIG. 5 illustrates one possible operational flow 500 for a variable round length scheduling method in a responder module 118. In some implementations, the scheduling method illustrated by operation flow 500 is performed by the responder module 118 each time an enumeration request is received by the responder module. In other implementations, the scheduling method illustrated by operation flow 500 is performed by the responder module 118 only at specified times. That is, in some implementations, the scheduling method illustrated by operation flow 500 is "turned on" or "turned off" based on various operational conditions or user needs.

At some time prior to performance of the operational flow 500 in the responder module, a transmission probability value ($\phi$) and/or an initial timing round duration value ($t_{initial}$) are determined. The transmission probability value ($\phi$) specifies a probability that a response will be issued in timing round. The initial timing round duration value ($t_{initial}$) specifies the duration of the first timing round of the variable round length scheduling method.

The values of $\phi$ and $t_{initial}$ may be selected empirically, or calculated based on various parameters, such as maximum network size, network transmission speeds, etc. Once obtained, the values of $\phi$ and $t_{initial}$ are stored in, or otherwise made accessible to, all of the responder modules 118 in the network.

In many implementations, the value $\phi$ is determined before the start of the enumeration session. In most implementations, the value $\phi$ remains constant throughout the scheduling method. In some implementations, the value $\phi$ has a first value for the first timing round in the scheduling method and is adjusted to a second value for the remaining timing rounds in the scheduling method, based on such factors as the observed process load.

In one implementation, the value of $t_{initial}$ is determined as follows. First, a maximum node value ($N_{max}$) is determined, which represents an estimate of the maximum number of accessible nodes in the network 100. The initial timing round duration value ($t_{initial}$) is then determined according to the following:

$$t_{initial} = \phi \times N_{max} \times I \quad \text{Equation (4)}$$

At operation 510, an enumeration request is received by the responder module 118. The receiving of the enumeration request begins, or "triggers," the scheduling method in the responder module 118. At operation 512, a determination is made whether the received enumeration request includes an indication that an enumeration response has already been received by the enumeration module 116 from the responder module 118 (a "positive acknowledgement"). For example, the responder module may have sent an enumeration response in a reply to an enumeration request sent at an earlier time in the enumeration session.

If it is determined at operation 512 that the received enumeration request includes a positive acknowledgement, the operational flow 500 ends. If, however, it is determined at operation 512 that the received enumeration request does not include a positive acknowledgement, a duration of the next timing round (T) is then determined at operation 514. The first time that operation 514 is performed, T is equal to $t_{initial}$. Each successive time in the operational flow that operation 514 is performed, T is determined based on observed responses sent from other responder modules. For example, in one implementation the value of T is calculated such that enumeration responses will be evenly distributed over the next timing round according to the following:

$$T = \phi \times N_r \times I \quad \text{Equation (5)}$$

Next, a timing round operation 516 begins a timing round of duration T. Substantially simultaneously with the start of the timing round, it is determined at operation 518 if an enumeration response is to be sent by the responder module 118 during the timing round. This determination is made with a probability $\phi$, described above. That is, some mechanism or algorithm is used to select whether an enumeration response will be sent during the present round with a probability $\phi$.

In one implementation, a responder has a minimum value of T with which it operates. This may be specified either directly in units of time as $T_{min}$, or indirectly as the number of nodes $N_{min}$. In such an implementation if T were to be less than $T_{min}$ (or $N_r$ were less than $N_{min}$), the duration of the timing round is set to $T_{min}$ and the probability is set to one.

If it is determined at operation 518 that an enumeration response is not to be sent during the current timing round, the operational flow 500 proceeds to operation 524, described below. However, if it is determined at operation 518 that an enumeration response is to be sent during the current timing round, the precise time during the round at which the enumeration response is to be sent is then made at operation 520. In one implementation, the time during the round at which the enumeration response is to be sent is selected randomly over the duration of the round. In other implementations, the time during the round at which the enumeration response is to be sent may be selected in other ways. Following operation 520, an enumeration response is sent at operation 522 at the time determined during operation 520.

Following operation 522, a count (r) is made at operation 524 of all nodes that send an enumeration response during the current timing round. In one implementation, the count (r) is made by the responder module by monitoring the network and counting the number of enumeration response that are sent in the network during the current timing round. It should be appreciated that while operation 524 is shown as occurring following operation 522, in operation, the count of enumeration response sent in the network during the current timing round would typically occur throughout all or most of the timing round.

Next, the operational flow 500 proceeds to operation 526 where the nodes remaining value ($N_r$) is estimated. In general, $N_r$ is estimated based on observed responses sent from other responder modules. It can be estimated that the number of responder modules that had yet to respond to the enumeration request at the beginning of the current round ($N_{current}$) was approximately $$N_{current} = \frac{r}{\phi}.$$

Using this estimation for $N_{current}$, the node remaining value ($N_r$) can then be estimated as follows:

$$N_r = N_{current} - r \approx \frac{r}{\phi} - r \quad \text{Equation (6)}$$

Next, a determination is made at operation 528 whether an enumeration request has been received during the current timing round. If it is determined that a request has been received during the current timing round, the operational flow returns to operation 512, described above. If it is determined that a request has not been received during the current timing round, the operational flow proceeds to operation 530, where a determination is made whether an inactivity condition has been met.

The inactivity condition may be selected and/or determined in a number of ways. For example, in one implementation, the inactivity condition is met if a given time has passed since the receipt of an enumeration request. If it is determined at operation 530 the inactivity condition has been met, the operational flow ends. However, if it is determined at operation 530 that determination the inactivity condition has not been met, the operational flow returns to operation 514, as previously described.

As described, the operational flow 500 will end when either an enumeration response including a positive acknowledgement is received (operation 512) or if an inactivity condition has been met (operation 530). In addition, in some implementations, at any point in the operational flow where an enumeration request is received, a determination is made whether the request includes a positive acknowledgment. If it is determined that the received request does not include a positive acknowledgment, the operational flow continues. For example, if a request is received following operation 516, but before operation 518, which does not include a positive acknowledgement, the operational flow would continue to operation 518. If it is determined that the received request does include a positive acknowledgment, the operational flow ends.

In the various timing methods described above, a responder module 118 will typically send enumeration responses each time an enumeration request is received. As also described, in various implementations a responder module will typically monitor the network 100 and count the number of enumeration responses that are sent during a given time period. This count is then used to estimate a number of responder modules $N_r$ that have yet to respond to an enumeration request. However, in some implementations, the responder module may reduce the load put on the network by sending responses out to the network as a whole (broadcasting) with a given probability z, and sending directed responses (unicast) to the enumerator module 116 with a probability of (1-z). In such implementations, it may still be possible to estimate $N_r$ by dividing the observed number of responses by z.

Figure 6:
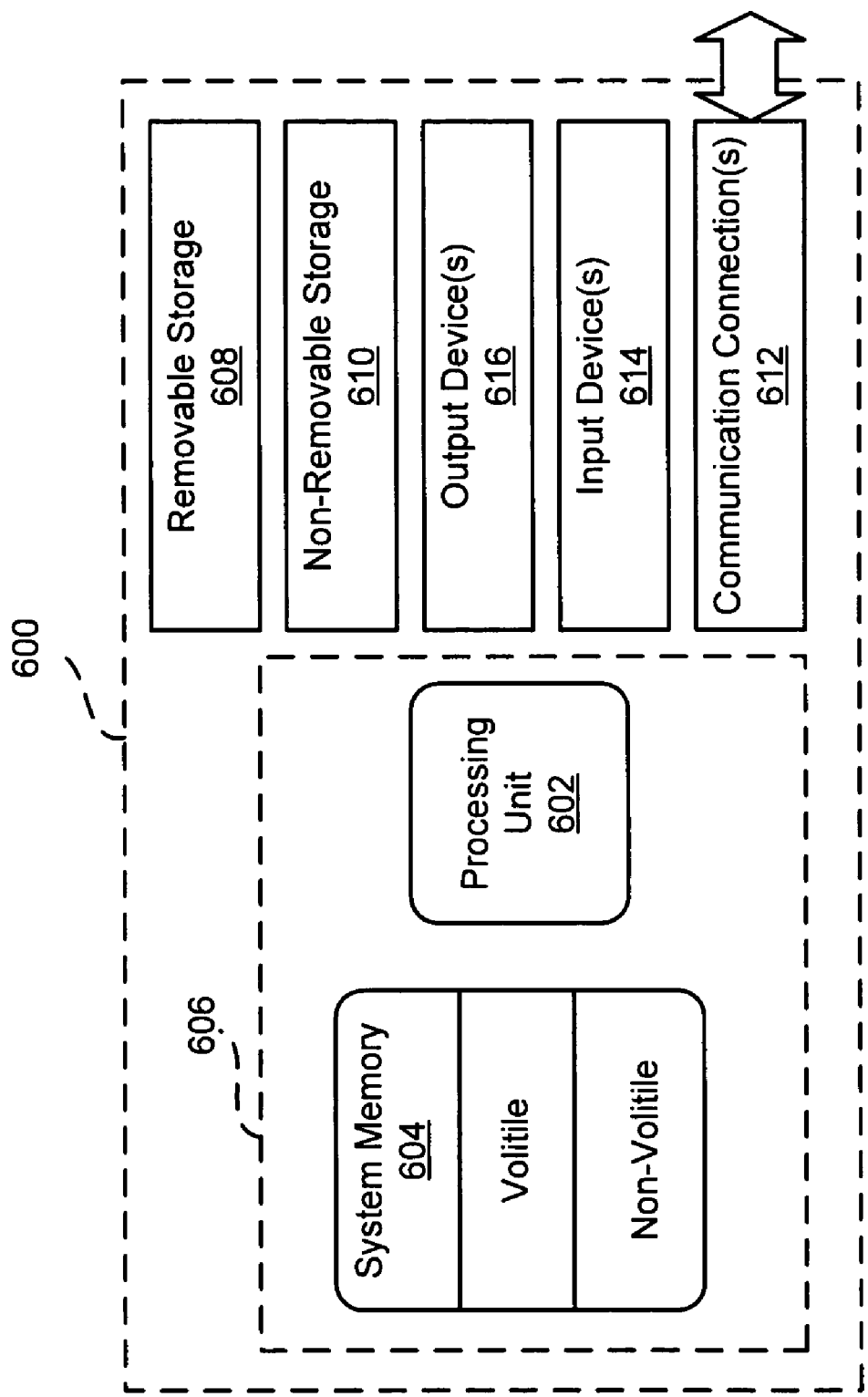
FIG. 6 illustrates an example network node in the form of a computer system.

FIG. 6 illustrates an example network node 110, in the form of a computer system 600. In its most basic configuration, computing system 600 includes at least one processing unit 602 and memory 604. Depending on the exact configuration and type of computing device, memory 604 may be volatile (such as RAM), non-volatile (such as ROM, flash memory, etc.), or some combination of the two. This most basic configuration is illustrated in FIG. 6 by dashed line 606. Additionally, computer system 600 may also have additional features/functionality. For example, device 600 may also include additional storage (removable and/or non-removable) including, but not limited to, magnetic or optical disks or tape. Such additional storage is illustrated in FIG. 6 by removable storage 608 and non-removable storage 610.

Computer system 600 may also contain communications connection(s) 612 that allow the device to communicate with other devices. Computer system 600 may also have input device(s) 614 such as keyboard, mouse, pen, voice input device, touch input device, etc. Output device(s) 616 such as a display, speakers, printer, etc. may also be included in computer system 600. All these devices are well known in the art and need not be discussed at length here.

In an exemplary implementation, an enumerator module, a responder module, and other modules may be embodied by instructions stored in memory 604 and/or storage devices 608 and 610 and processed by the processing unit 602. Session state tables and records, discovery states, acknowledgments, enumeration requests, enumeration responses, and other data may be stored in memory 404 and/or storage devices 608 and 610.

Figure 7:
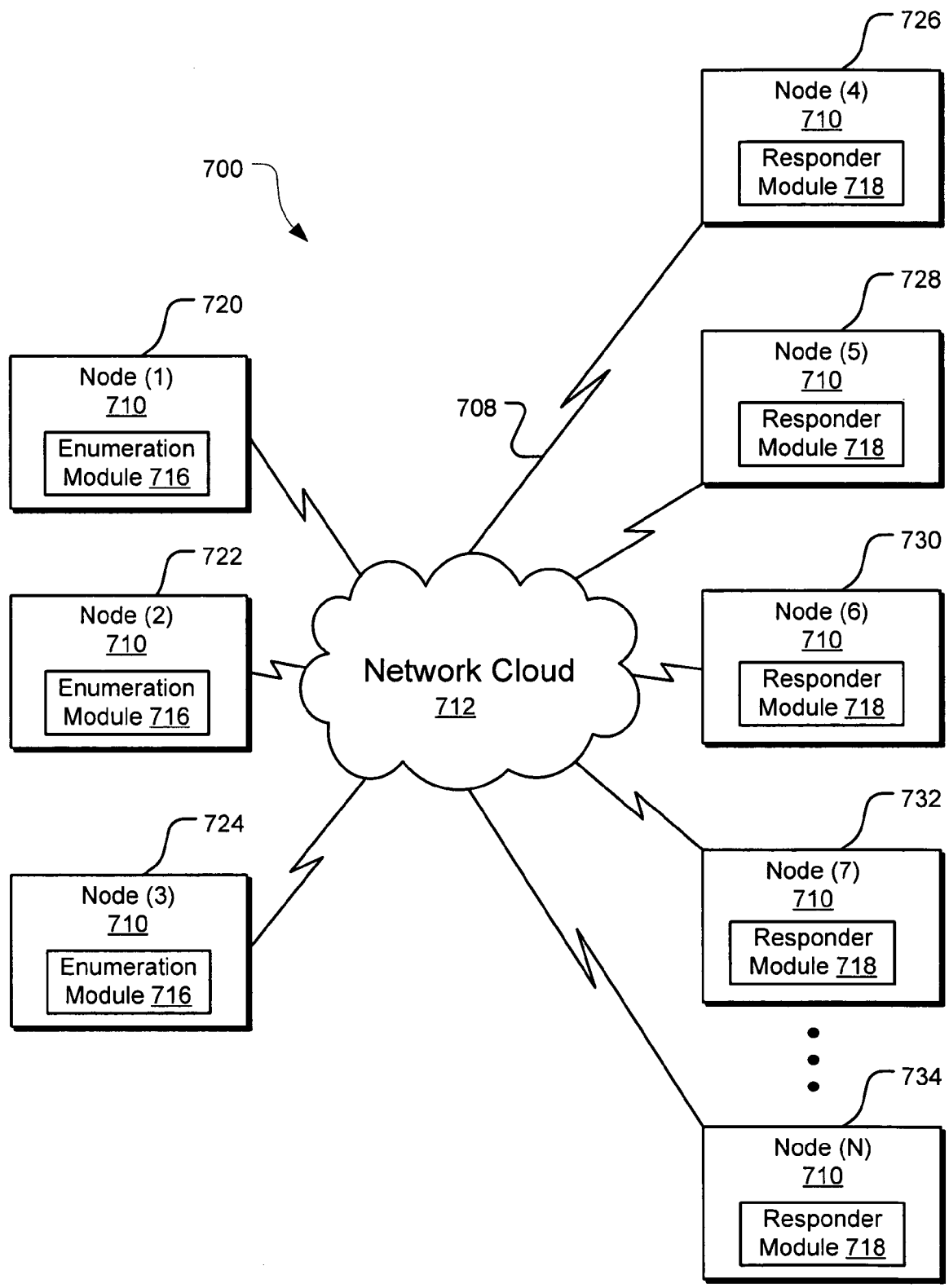
FIG. 7 illustrates an exemplary computer network in which network node enumeration is implemented in the presence of multiple node enumerators.

FIG. 7 illustrates an exemplary computer network 700 in which network node enumeration is implemented in the presence of multiple node enumerators. The computer network 700 is merely exemplary, and it should be understood that other network configurations, protocols, and operations may be employed in the presence of multiple node enumerators. The computer network 700 includes some number (N) of nodes 710 interconnected through a network cloud 712. The variable N is used to represent an individual node's estimate of the number of accessible nodes on the network. Different nodes can have different estimates of this number, but the individual estimates are usually similar in value. In FIG. 7, an arbitrary estimate N is used. A jagged line between a node 710 and the network cloud 712, such as line 708, indicates that a node 710 is accessible (i.e., "on-line") in the network 700.

As shown, node (1) 720, node (2) 722, and node (3) 724 include enumerator modules 716, whereas node (4) 726, node (5) 728, node (6) 730, node (7) 732, node (N) 734 include responder modules 718. It should be understood that a node may include both a responder module and an enumerator module. With regard to FIG. 7, it is assumed that node (1) 720, node (2) 722, and node (3) 724 also include responder modules (not shown, but which may also be referred to as responder modules 718). The modules are similar to those discussed with regard to FIG. 1, although the modules illustrated in FIG. 7 are specifically described to support concurrent enumeration operations from multiple nodes.

In a multiple enumerator network, any enumerator can start at any time, including when none, one, or a plurality of other enumerators are already active. In addition, the network can be temporarily partitioned (such as by a hardware failure within the network) and reconnected when a plurality of enumerators are active, causing a large instantaneous change in the number of active nodes that are visible to each other.

In one implementation, each enumeration module 716 can transmit enumeration request through the network cloud 712 and process enumeration responses from multiple nodes 710. In one implementation, enumeration requests may include without limitation an identifier of the requesting enumerator and acknowledgement information identifying (i.e., acknowledging) nodes 710 that have previously responded to an enumeration request. In one example, an enumeration request includes an enumerator identifier ("eid") and a sequence identifier ("xid"), wherein the sequence identifier is provided by the enumerator to distinguish between separate enumeration sessions initiated by the enumerator. The enumerator identifier can be any identifier that allows the responder module 718 to distinguish between different enumerators, such as an IP address, a MAC address or another node or module identifier. In one implementation, a sequence identifier distinguishes between different enumeration sessions for a particular enumerator, allowing a responder module to detect when an enumerator restarts its enumeration session. Other exemplary characteristics of an enumeration request are discussed with regard to FIG. 1. Upon receiving an enumeration response, the enumeration module 716 stores information provided in the response for processing or later retrieval, such as discussed with regard to FIG. 1.

For their part, the responder modules 718 generate responses to the enumeration requests of one or more enumeration modules 716 and process the acknowledgements from the various enumerator modules 716. In one implementation, each responder module 718 maintains a session state for each requesting enumerator and a separate discovery state for the responding node. When an enumeration request is received by a responder module 718, the responder module 718 examines the enumeration request and determines the enumerator identifier and the sequence identifier associated with the request. The responder module 718 then updates the session state associated with the enumerator identifier and updates the discovery state of the responding node, if appropriate. The issuance of responses by the responding node is governed by the discovery state, which is dependent upon the session state associated with each enumerating node.

Figure 8:
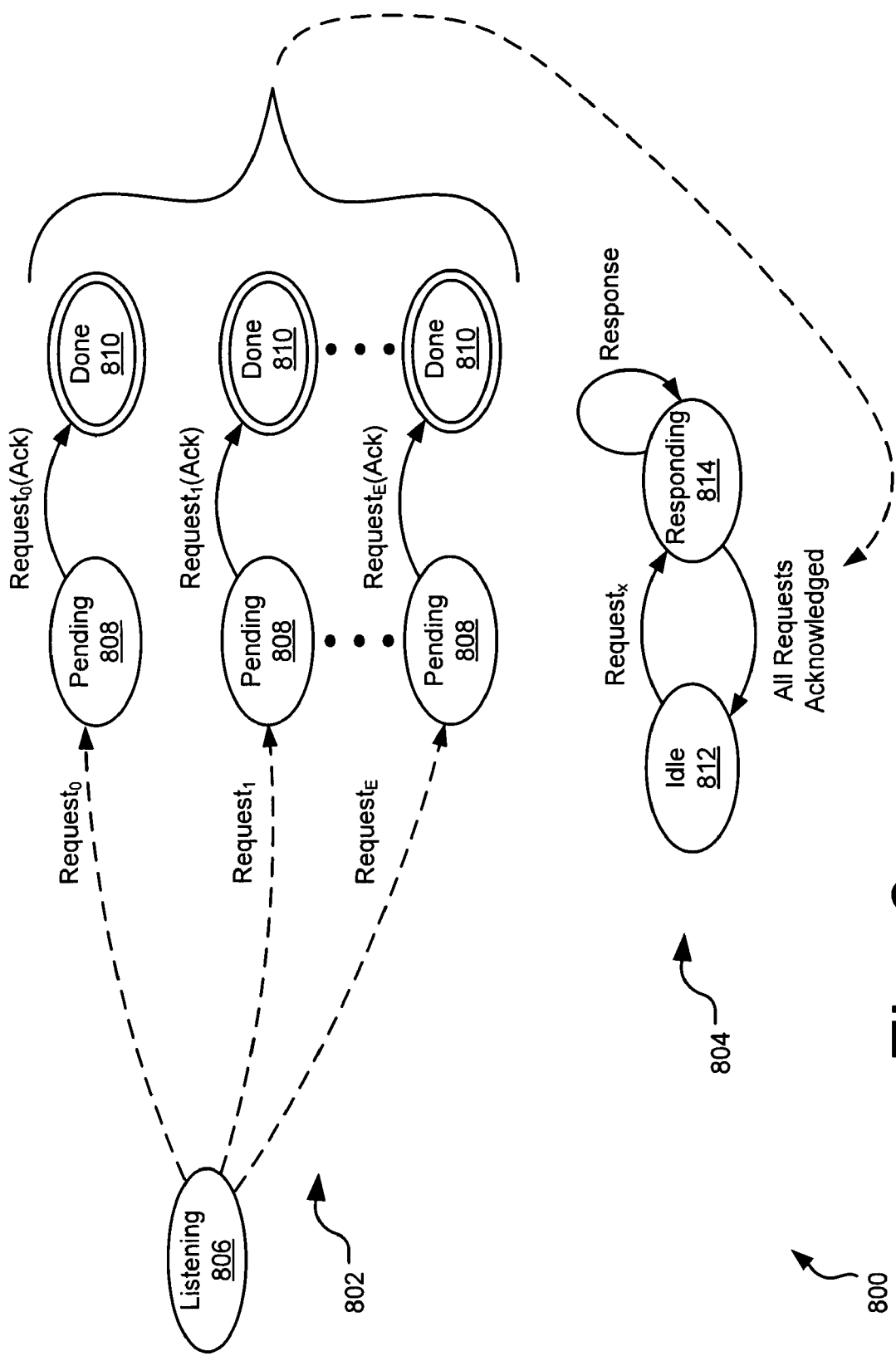
FIG. 8 illustrates a two-part simplified state transition diagram illustrating example states through which a responder module may transition during network enumeration.

FIG. 8 illustrates a two-part simplified state transition diagram 800 illustrating example states through which a responder module may transition during network enumeration. In one implementation, each responder module maintains a session state (see session state diagram 802) for each requesting enumerator observed. For example, the session states may be maintained as a session state table (or generally a session state datastore, whether in table form or not) having individual session state records, wherein each record relates an enumerator identifier, a sequence identifier, and a session state value. In one implementation, a session state record may also include an active time value and/or a retransmission counter associated with a requesting enumerator. In an alternative implementation, a single retransmission counter is maintained by a responder module, rather than one for each enumerator. Exemplary session states may include LISTENING, PENDING, and DONE. Another possible session state value may include IDLE (see below). Likewise, each responder modules maintains a discovery state (see discovery state diagram 804). In one implementation, the discovery state may be maintained to include two discovery state values: IDLE and RESPONDING.

The active time value (also referred to as refresh time value) represents a time at which an associated enumerator last issued an enumeration request. The active time value is used by the responder to detect idle enumerators (e.g., an enumerator that stops sending enumeration requests but has not yet acknowledged the responder), to track active enumerators (e.g., to prevent treating a lengthy enumeration as several different enumerations), and to detect a complete enumeration (e.g., if the enumerator does not indicate completeness or the responder does not observe an acknowledgement, such as due to packet loss). If an idle enumerator or a complete enumeration is detected, the responder module updates the session state, such as by deleting the session state record for the idle enumerator from the table, by clearing the session state record for the idle enumerator, setting the session state for the idle enumerator to an IDLE state, etc.

FIG. 8 also shows a LISTENING session state 806 to indicate a virtual state in which the responder module is listening for enumeration requests. The session state diagram 802 indicates that receipt of an enumeration request while the session state is LISTENING causes the session state to transition into a PENDING state 808 associated with the requesting enumerator (e.g., Request$_2$). As such, the LISTENING session state 806 appears to branch into multiple possible session states, one for each requesting enumerator detected (FIG. 8 shows session states for E enumerators). New enumerators can enter an enumeration process at any time, causing a new branch from the LISTENING session state 806. In some implementations, for example, the branching may indicate a creation of a new session state record for a newly detected enumerator in a session state table or an updating of an existing session state record for new information about a previously detected enumerator. Likewise, recently observed enumerators can drop out of the enumeration process at any time. These entries and exits of one or more enumerators can result in a very dynamic set enumerators participating in a single enumeration process. It should also be understood that the state transition diagram illustrated in FIG. 8 is only exemplary and that other states and transitions may be employed.

When an enumeration request is received by a responder node, a responder module of the node determines the enumerator identifier and the sequence identifier from the enumeration request. Depending on the session and discovery states, the responder module can respond in different ways:

With regard to the session state, if the enumerator identifier is new to the responder module (e.g., no associated session state record exists), the responder module creates a session state record for the enumerator identifier in a session state table, stores the sequence identifier from the enumeration request into the session state table, and sets the session state value to PENDING and active time value to a determined value in the session state table. The responder module also updates the retransmission count to the retransmission threshold and can set a BEGUN flag. The BEGUN flag can be detected at the end of a round to trigger some refinements to the nodes remaining estimate $N_r$ for the next round, as described below.

If the enumerator identifier is not new to the responder module, then the responder module reads the existing session state record corresponding to the enumerator identifier in the enumeration request and compares the sequence identifier in the session record with the sequence identifier in the enumeration request. If they match and the enumerator has not acknowledged the responding node in the enumeration request, then the active time is updated (e.g., to the current time). If the sequence identifiers do not match, then the existing session state record is deleted and replaced with a new session state record constructed as described in the previous paragraph (or alternatively, updated to provide the same initial state). If the sequence identifiers match and the enumerator is acknowledging the responding node in the enumeration request, then the session state associated with the enumerator is set to DONE state 810.

It should be understood that the responder module maintains a session state for each requesting enumerator. The effects of the multiple session states are managed in part by the discovery state. If the discovery state of the responder module is currently in the IDLE state 812 and receives an enumeration request from any enumerator module, then the responder module transitions to the RESPONDING state 814. While in the RESPONDING state 814, the responder module periodically transmits enumeration responses that can be received and acknowledged by one or more enumerators. In one implementation, a responder module will transmit enumeration responses until a determined number of responses have been transmitted (e.g., a retransmission threshold of four responses) or until all currently PENDING enumerators have acknowledged receipt of an enumeration response from the response node (i.e., all session states have transitioned into the DONE state 810). If either of these conditions occurs, the discovery state returns to the IDLE state 812.

Figure 9:
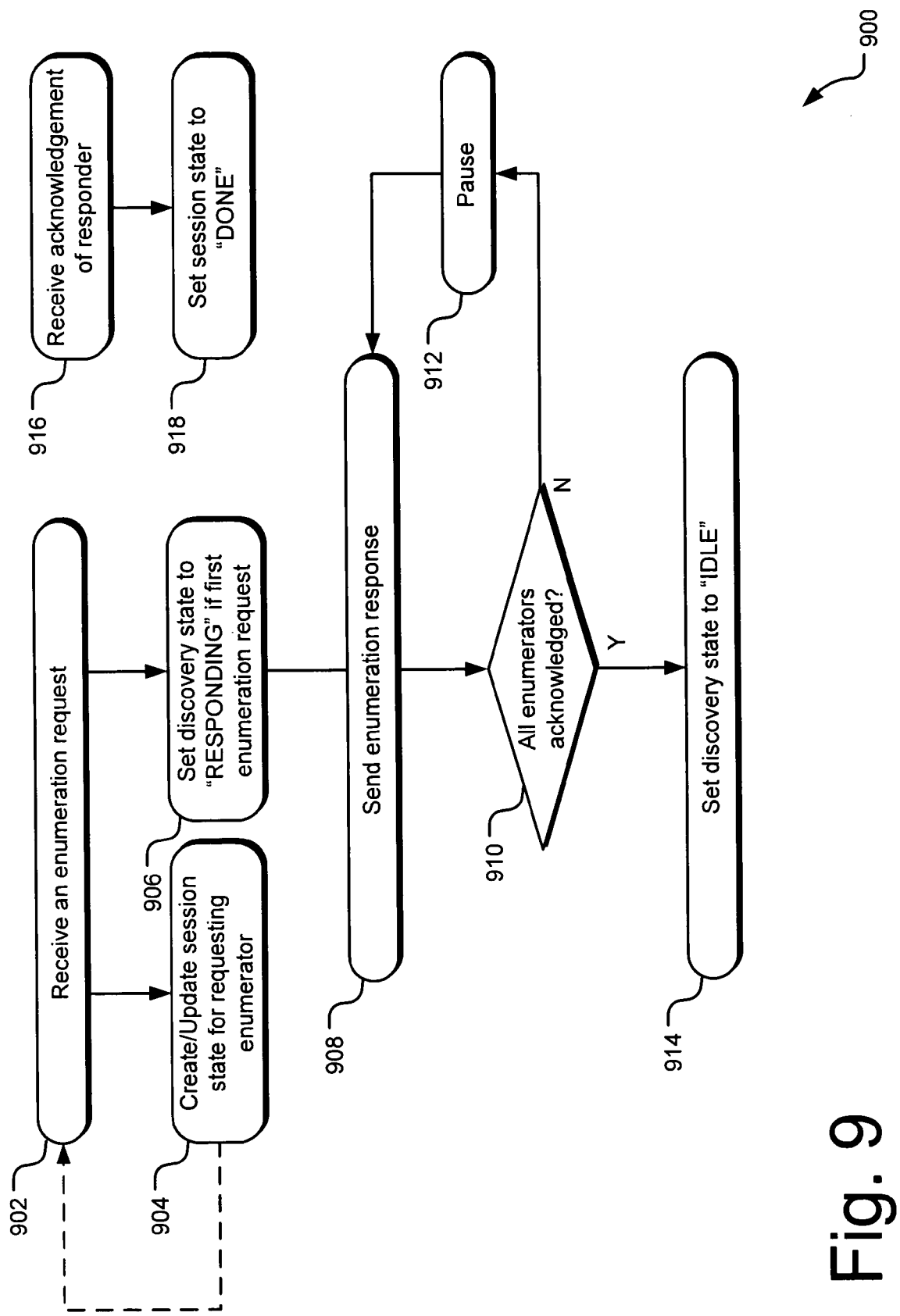
FIG. 9 illustrates exemplary operation for managing enumeration responses.

It should be understood that a retransmission counter managing retransmission relative to a determined retransmission threshold may be updated with receipt of an enumeration request from a new enumerator. As such, if a responder has a retransmission threshold of four and has responded twice before receiving an enumeration request from a new enumerator, the retransmission counter can be reset to cause four subsequent enumeration responses FIG. 9 illustrates exemplary operation 900 for managing enumeration responses. Generally, a responder listens for enumeration requests, which may include an enumerator identifier (i.e., identifying the enumerator making the request) and a sequence identifier (e.g., identifying the enumeration session specified by the enumerator). In some enumeration requests, the enumerator may also acknowledge those responders for which it has received and accepted enumeration responses. Receiving operations 902 and 916 represent separate and potentially concurrent operations for receiving enumeration requests and acknowledgements, although it should be understood that, as acknowledgements may be received in enumeration requests, these receiving operations 902 and 916 may be a singular operation in some implementations.

The receiving operation 902 receives an enumeration request from an enumerator. A session state operation 904 derives an enumerator identifier and a sequence identifier from the enumeration request and creates or updates the session state associated with the enumerator identifier.

For example, if a responder receives an enumeration request from an enumerator having a sequence identifier of "2", then the session state operation 904 determines whether a session state is already recorded for the enumerator (e.g., in a session state table). If so and if the sequence identifier associated with the session state of the enumerator equals "2", then the session state recorded for the enumerator is updated (e.g., the active time is updated). However, if the sequence identifier for the existing session state record associated with enumerator does not equal "2", then the session state record is cleared and recreated (or merely updated) to reflect the new sequence identifier, an updated active time, and a PENDING session state, and a BEGUN flag may be set.

Further, if the session state record maintained by the responder for the enumerator does not already exist, then a session state record is created with a sequence identifier "2", an updated active time, and a PENDING session state, and a BEGUN flag may be set. It should be understood that the receiving operation 902 and the session state operation 904 may occur multiple times for the same enumerator in the same session or in different enumeration sessions and/or for different enumerators concurrently.

Furthermore, while one or more enumeration requests are being processed by operations 902 and 904, a discovery state is also being maintained. If the discovery state is in an IDLE state, a first request operation 906 sets a discovery state maintained by the responder is set to RESPONDING, responsive to receipt of an enumeration request. This state transition indicates that the received enumeration request was a first enumeration request received in a set of one or more concurrent enumeration sessions.

A response operation 908 sends an enumeration response (e.g., according to a response schedule described herein based on a periodically updated nodes remaining estimate) while the discovery state is in a RESPONDING state. An enumeration response may include a responder identifier, among other data, so as to inform any listening enumeration nodes which responder is indicating that it is active in the network.

The receiving operation 916 receives an acknowledgement (e.g., with an enumeration request or otherwise) that the requesting enumerator has received and accepted the enumeration response of the responder. Accordingly, a session state operation 918 finds the session state record associated with the requesting enumerator and sets the session state for that enumerator to DONE.

A decision operation 910 determines whether all of the enumerators from which enumeration requests have been received have acknowledged the responder (e.g., are all of the session state records maintained by the responder indicating a DONE session state), subject to various session state timeouts and resets. If not, the discovery state remains in the RESPONDING state and processing returns to the response operation 908, subject to a pause operation 912, which spaces out the node's responses (evenly or non-evenly). Otherwise, if all of the enumerators have acknowledged the responder, then a discovery state operation 914 sets the discovery state is set to IDLE, until a new enumeration request is received.

In one operation, the pause operation 912 updates the nodes remaining estimate and schedules a possible enumeration response accordingly, e.g., subject to a determined delay. In a multiple enumerator implementation, an example nodes remaining estimate may be recomputed as follows:

$$N_r = \frac{N_{previous} \times r \times I}{t_d} \qquad \text{Equation (7)}$$

Using this nodes remaining estimate, a new round duration may be computed to enforce the determined delay in transmission of a response. Alternatively, a probability of responding may be computed, which also introduces a determined delay in transmission of a response. Other determined delays may also be employed.

In addition, in one implementation, if the BEGUN flag is set, the estimate may be adjusted to mitigate the possibility of a large number of responses by active nodes (e.g., such as when there are a large number of quiescent responders (e.g., in an IDLE or DONE state) receiving an enumeration request from a new enumerator). For example, if the BEGUN flag is set (indicating receipt of an enumeration request by a new enumerator), the nodes remaining estimate $N_r$ is enhanced for a subsequent round. In one implementation, if the nodes remaining estimate $N_r$ is less than half of $N_{max}$, then the nodes remaining estimate $N_r$ is doubled for the next round. If $N_r$ is greater than half of $N_{max}$ but less than $N_{max}$, $N_r$ is set to $N_{max}$. If $N_r$ is greater than Nmax, $N_r$ is left unchanged. This algorithm represents an example approach that enhances the nodes remaining estimate to reduce the impact of a large number of quiescent responders responding to a new enumeration request at once, although algorithms are also contemplated. In this manner, the quiescent responders will have larger estimate in the next round, thereby slowing their responses and allowing existing enumeration sessions to complete before the new one.

In one implementation, the processing of operations 908, 910, and 912 is limited to a determined retransmission threshold (e.g., four responses in one implementation). If a responder's retransmission counter satisfies the retransmission threshold without all enumerators acknowledging the responder, then the discovery state operation 914 nonetheless quits and sets the discovery state to IDLE. It should be understood that a retransmission counter can be reset responsive to receipt of an enumeration request from a new enumerator or in a new enumeration session (e.g., the sequence identifiers do not match).

Given a described method for managing enumeration responses for multiple enumerators, the enumerator logic can also be altered to improve the system. Because multiple enumerators are making requests to one or more responders, a condition exists in which an enumerator can determine that it can obtain the enumeration responses it needs without issuing its own enumeration requests and acknowledgements, thereby reducing the overall network load.

In one implementation, each enumerator can observe requests from other enumerators and maintain a count $C_E$ of distinct enumerators making requests. With this count, each enumerator has a stealth condition module can determine whether the load caused by each such enumerator sending acknowledgements would be larger than the load caused by each responder sending a number of responses satisfying its retransmission threshold (e.g., four responses). An example stealth condition may be given as:

$$responseLoad < acknowledgementLoad \qquad \text{Equation (8)}$$

$$N_i \cdot retransmissionThreshold < C_E \cdot \frac{N_i}{A} + N_i$$

where A represents the number of acknowledgements that can be grouped into a single packet. If this stealth condition is true, an enumeration request module in the enumerator can enter "stealth" mode and refrain from sending subsequent enumeration request/acknowledgement packets, at least until the condition changes. In this manner, a "stealth" enumerator merely observes and records enumeration responses from responders that are responding to enumerator requests from other enumerators. The stealth enumerator does not add to the network traffic by transmitting its own enumeration requests and acknowledgements. It should also be understood that other stealth conditions may also be computed and used in independently or in combination with the stealth condition of Equation (8), such as a stealth condition based on impact on a target load, based on a fixed threshold of enumerators, etc.

An enumerator can also evaluate the load on the network by counting packets over an interval called an estimation interval (referred to as "estimateInterval"). This estimation interval can be the same as the timing round duration variable $t_d$. Alternatively, this estimation interval may represent the time between transmission of enumeration requests or acknowledgements by the enumerator. Other estimation intervals may also be employed, and these estimation intervals may be either variable or fixed. For example, in one implementation, the estimation interval is related to the round interval but is increased linearly with the number of enumerators known to the enumerator of interest. If the estimation interval was initially the same as the roundInterval used by responders (e.g., when $C_E=1$: the enumerator of interest), then the estimateInterval could be calculated over time, as the enumerator of interest observes other enumerators, by:

$$estimateInterval = C_E \cdot roundInterval \qquad \text{Equation (9)}$$

where the roundInterval may be obtained from the timing round duration variables $t_d$ or T.

The estimation interval may be used by an enumeration to manage enumeration requests. For example, in one implementation, if an enumerator has not received an enumeration response from any new (i.e., not previously-acknowledged responder nodes) in the current enumeration session for one full estimateInterval and the enumeration load on the network is below 50% of the target network load, then the enumerator stops issuing enumeration requests. The enumeration load may be determined from all enumeration responses observed by the enumerator during the estimateInterval. Other enumeration request control mechanisms may be employed based on an estimation interval.

Figure 10:
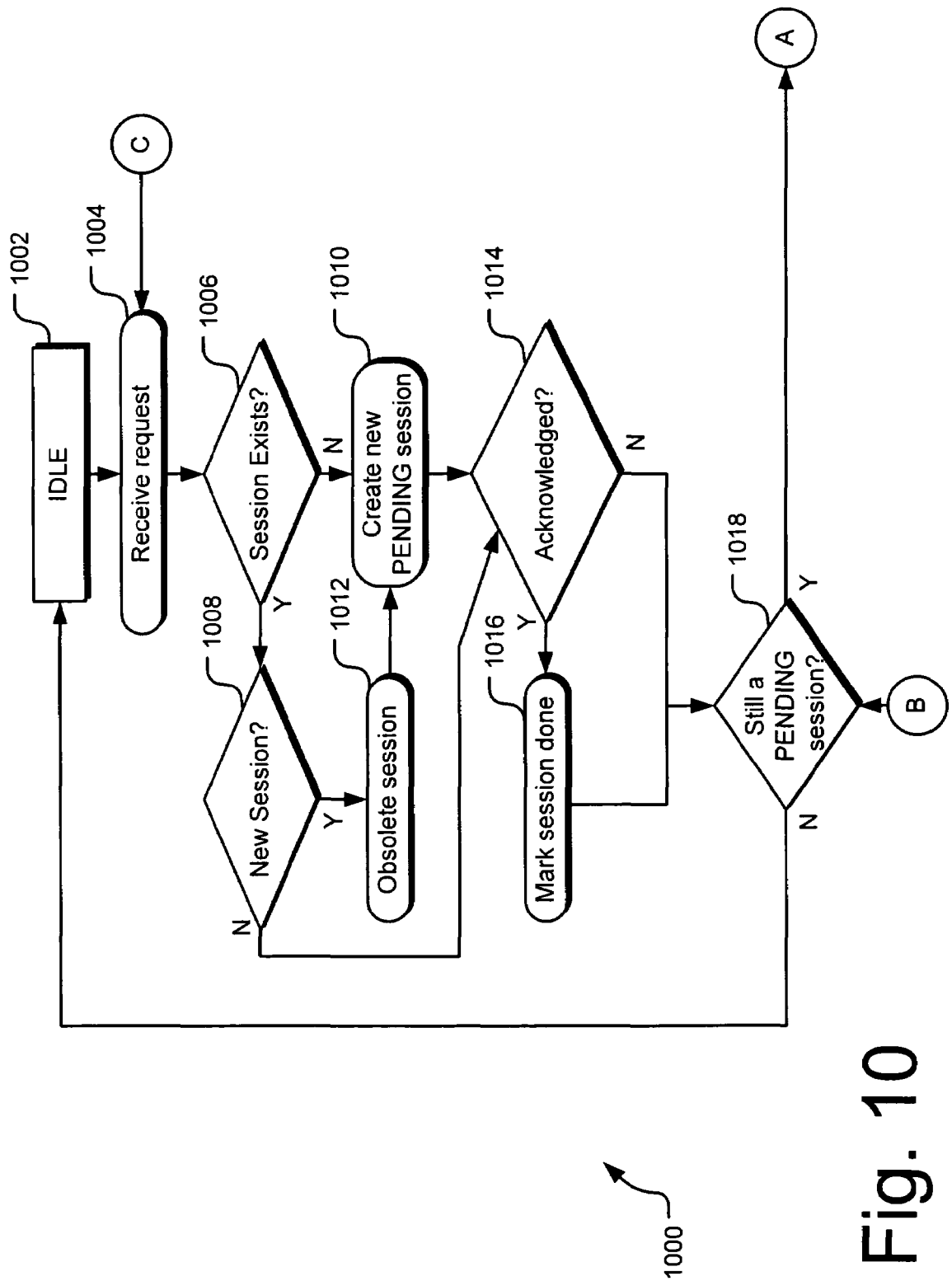
FIGS. 10 and 11 illustrate alternative exemplary operations for managing enumeration responses.
Figure 11:
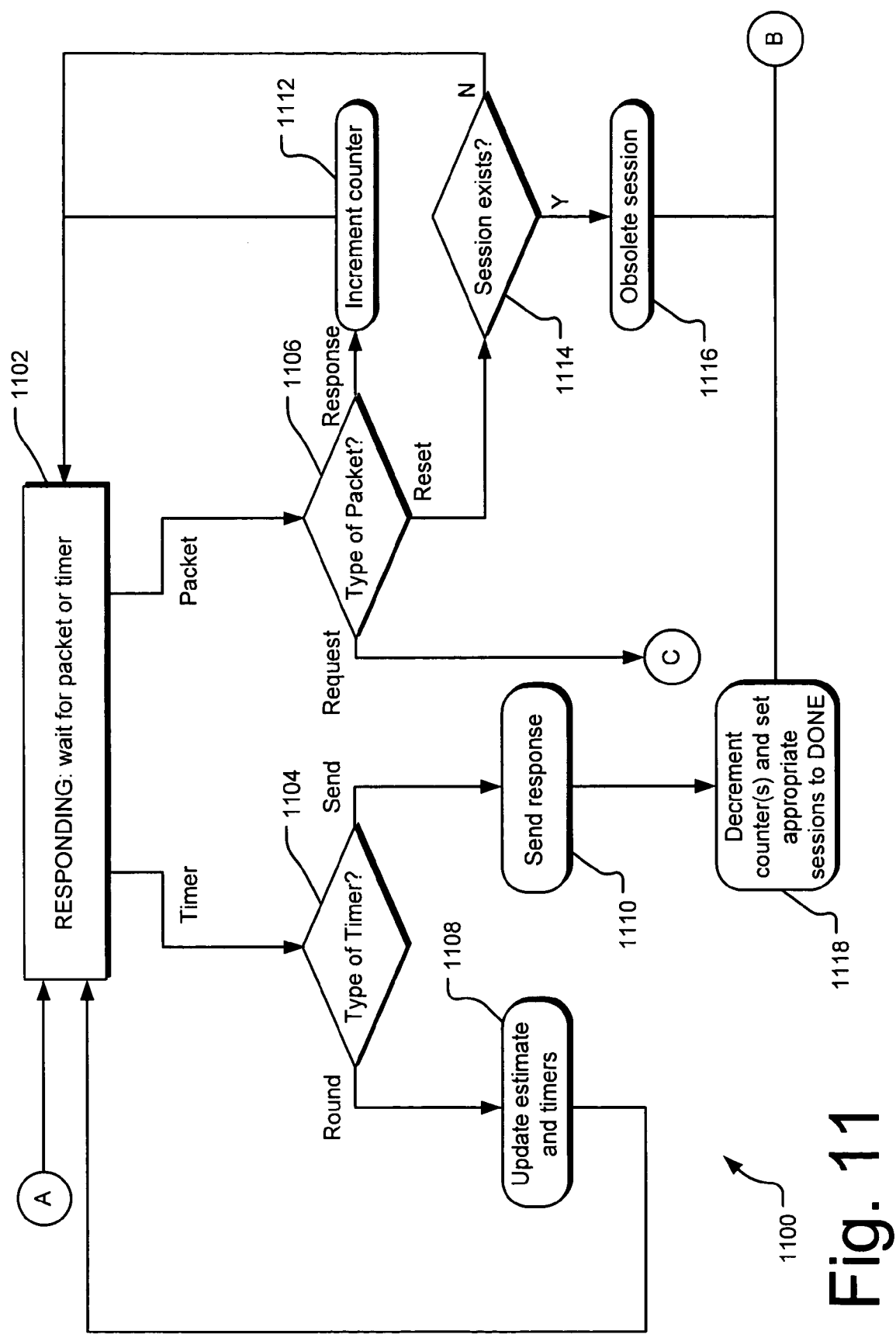

FIGS. 10 and 11 illustrate alternative exemplary operations 1000 and 1100 for managing enumeration responses. It should be understood that the operations illustrated and described with regard to FIGS. 10 and 11 can also be used in combination with operations illustrated and described with regard to FIG. 9.

A responder starts in an IDLE session state 1002. A receive operation 1004 receives an enumeration request from an identified enumerator and determines an enumerator identifier and a sequence identifier from the enumeration request. Receipt of the enumeration request transitions the responder from the IDLE session state 1002. A decision operation 1006 determines whether the identified enumerator already has a session state started with the responder (e.g., by finding a session state record having an enumerator identifier that matches the enumerator identifier extracted from the enumeration request). If so, this implies that the responder has heard from this enumerator before, and another decision operation 1008 determines whether the existing session state has a sequence identifier that matches the sequence identifier extracted from the enumeration request. If not, an obsoleting operation 1012 obsoletes the existing session state for the enumerator (e.g., by deleting it, clearing it, setting an obsolete flag, etc.). After the obsoleting operation 1012, or if the decision operation 1006 does not detect a session state for the identified enumerator, a creation operation 1010 creates a new session state record with a PENDING state or otherwise sets an obsoleted session state record to PENDING and updates the sequence identifier in the session state record.

If the decision operation 1008 determines that the sequence identifiers match, that implies the enumerator is still in the same session as previously recorded by the responder, and processing proceeds to the decision operation 1014, which tests whether the responder has been acknowledged by the enumerator. If so, the session state is set to DONE and processing proceeds to a decision operation 1018. If not, processing proceeds direction to the decision operation 1018.

If the decision operation 1018 determines whether a PENDING session state still exists for the responder. If not, processing proceeds to the IDLE state 1002. Otherwise, processing proceeds through connector A to a RESPONDING state 1102 in FIG. 11.

In the RESPONDING state 1102, the responder waits for receipt of a packet or expiration of a timer. If a packet is received, a decision operation 1106 determines the type of packet received. If the packet is an enumeration request packet, processing proceeds through connector C to the receiving operation 1004 of FIG. 10. If the packet is a response packet from another responder, a responder count is increased (assuming the individual responder has not already been counted) and processing proceeds to the RESPONDING state 1102. If the packet is a reset packet received from an enumerator, then a decision operation 1114 determines whether a session state already exists for the enumerator. If so, the session state is obsoleted in an obsoleting operation 1116 and processing proceeds through connector B to the decision operation 1018 in FIG. 10. Otherwise, processing proceeds to the RESPONDING state 1102.

In the RESPONDING state 1102, if the responder detects expiration of a timer, a decision operation 1104 determines which timer has expired. If the timer is a round duration timer, an updating operation 1108 re-estimates the nodes remaining estimate and resets the round timers and/or response probability accordingly. Alternatively, if the timer is a send timer, a responding operation 1110 sends and enumeration response. A clean up operation 1118 decrements the retransmission counter(s) and sets the session states to a DONE state, if the retransmission threshold is satisfied. Processing then proceeds through connector B to the decision operation 1018 in FIG. 10.

Although some particular implementations of systems and methods have been illustrated in the accompanying drawings and described in the foregoing Detailed Description, it will be understood that the systems and methods shown and described are not limited to the particular implementations described, but are capable of numerous rearrangements, modifications and substitutions without departing from the spirit set forth and defined by the following claims.

What is claimed is:

1. A method of managing enumeration traffic by a selected enumerator in a computer network, the method to be performed on a computing system, the computing system comprising a processing unit coupled to a memory, the method comprising:

using the processing unit to detect enumeration requests from one or more enumerators in the computer network;

computing a stealth condition based on detection of the enumeration requests from the one or more enumerators, wherein the stealth condition is a condition in which the selected enumerator determines whether or not the selected enumerator can obtain needed enumeration responses without issuing enumeration requests and acknowledgements, wherein the computing operation comprises:

computing an acknowledgement load attributable to the one or more enumerators in the computer network;

computing a response load attributable to responders responding to the enumeration requests of the one or more enumerators in the computer network, wherein the stealth condition determines whether the acknowledgment load exceeds the response load;

transmitting enumeration requests from the selected enumerator in the computer network, if the stealth condition is not satisfied since the acknowledgement load does not exceed the response load and the selected enumerator determined that the selected enumerator cannot obtain needed enumeration responses without issuing enumeration requests and acknowledgements; and refraining from transmission of enumeration requests from the selected enumerator, if the stealth condition is satisfied since the acknowledgement load exceeds the response load and the selected enumerator determined that the selected enumerator can obtain needed enumeration responses without issuing enumeration requests and acknowledgments.

2. The method of claim 1 further comprising:

counting by the selected enumerator the enumeration requests from the one or more enumerators in the computer network to determine a count of the one or more enumerators.

3. The method of claim 2 wherein the acknowledgement load depends upon the count of the enumerators transmitting enumeration requests in the computer network.

4. The method of claim 1 wherein the acknowledgement load depends upon an estimate of a remaining number of active nodes to respond in the computer network.

5. The method of claim 1 wherein the response load depends upon an estimate of a remaining number of active nodes to respond in the computer network.

6. The method of claim 1 wherein the response load depends upon a retransmission threshold attributed to the responders.

7. The method of claim 1 wherein the computing operation comprises:

computing a network load caused by transmitting acknowledgements from the one or more enumerators to the responders.

8. The method of claim 1 wherein the computing operation comprises:

computing a network load caused by the responders transmitting a retransmission threshold number of enumeration responses in response to the enumeration requests of the one or more enumerators.

9. A computer-readable medium having computer-executable instructions for performing a computer process implementing the method of claim 1.

10. A network node that manages enumeration traffic in a computer network, the network node comprising:

an enumeration module that detects enumeration requests from one or more enumerators in the computer network, the enumeration module embodied in a computer-readable medium;

a stealth condition module that computes a stealth condition based on detection of the enumeration requests from the one or more enumerators, wherein the stealth condition is a condition in which a selected enumerator determines whether or not the selected enumerator can obtain needed enumeration responses without issuing enumeration requests and acknowledgements, wherein the stealth condition module computes an acknowledgement load attributable to the one or more enumerators in the computer network and computes a response load attributable to responders responding to the enumeration requests of the one or more enumerators in the computer network, wherein the stealth condition determines whether the acknowledgment load exceeds the response load, the stealth condition module embodied in a computer-readable medium;

an enumeration request module that transmits enumeration requests, if the stealth condition is not satisfied since the acknowledgement load does not exceed the response load and the selected enumerator determined that the selected enumerator cannot obtain needed enumeration responses without issuing enumeration requests and acknowledgements, and refrains from transmitting enumeration requests, if the stealth condition is satisfied since the acknowledgement load exceeds the response load and the selected enumerator determined that the selected enumerator can obtain needed enumeration responses without issuing enumeration requests and acknowledgments, the enumeration request module embodied in a computer-readable medium.

11. The network node of claim 10 wherein the enumeration module counts the enumeration requests from the one or more enumerators in the computer network to determine a count of the one or more enumerators.

12. The network node of claim 11 wherein the acknowledgement load depends upon the count of the enumerators transmitting enumeration requests in the computer network.

13. The network node of claim 10 wherein the acknowledgement load depends upon an estimate of a remaining number of active nodes to respond in the computer network.

14. The network node of claim 10 wherein the response load depends upon an estimate of a remaining number of active nodes to respond in the computer network.

15. The network node of claim 10 wherein the response load depends upon a retransmission threshold attributed to the responders.

16. The network node of claim 10 wherein the stealth condition module that computes a network load caused by transmitting acknowledgements from the one or more enumerators to the responders.

17. The network node of claim 10 wherein the stealth condition module computes a network load caused by the responders transmitting a retransmission threshold number of enumeration responses in response to the enumeration requests of the one or more enumerators.

18. A network node that manages enumeration traffic in a computer network, the network node comprising:

means for detecting enumeration requests from one or more enumerators in the computer network;

means for computing a stealth condition based on detection of the enumeration requests from the one or more enumerators, wherein the stealth condition is a condition in which a selected enumerator determines whether or not the selected enumerator can obtain needed enumeration responses without issuing enumeration requests and acknowledgements, wherein the means for computing the stealth condition computes an acknowledgement load attributable to the one or more enumerators in the computer network and computes a response load attributable to responders responding to the enumeration requests of the one or more enumerators in the computer network, wherein the stealth condition determines whether the acknowledgment load exceeds the response load;

means for transmitting enumeration requests from the selected enumerator in the computer network, if the stealth condition is not satisfied since the acknowledgement load does not exceed the response load and the selected enumerator determined that the selected enumerator cannot obtain needed enumeration responses without issuing enumeration requests and acknowledgements; and means for refraining from transmission of enumeration requests from the selected enumerator, if the stealth condition is satisfied since the acknowledgement load exceeds the response load and the selected enumerator determined that the selected enumerator can obtain needed enumeration responses without issuing enumeration requests and acknowledgments.

\* \* \* \* \*